Nov. 6, 1923.        P. JONES         1,472,913
PNEUMATIC TIRE
Filed April 14, 1921

Inventor:
Peter Jones,
by [signature] and [signature],
Associate Attys.

Patented Nov. 6, 1923.

1,472,913

UNITED STATES PATENT OFFICE.

PETER JONES, OF WIGAN, ENGLAND.

PNEUMATIC TIRE.

Application filed April 14, 1921. Serial No. 461,184.

*To all whom it may concern:*

Be it known that I, PETER JONES, a subject of the King of Great Britain, residing at Wigan, in the county of Lancaster and Kingdom of England, have invented certain new and useful Improvements in Pneumatic Tires, of which the following is a specification.

This invention has for its object the provision of an armored tire which will practically prevent the cover or shoe from creeping or from nipping the inner tube when the latter is deflated; that shall to a very great extent prevent a perforation on the tread of the tire and shall, when deflated under a load, avoid the almost certain chance of a stone passed over cracking the armor of the deflated tire. Also, a tire having an armor which will not, like nearly all armor provided in tires at the present time, actually cause perforation.

At the present time, in the case of a puncture on the road and the consequent deflation of the tire, the comparatively sharp inner edges of the beads of the tire come together and nip the inner tube between them, thereby damaging the same. Furthermore, when the tire passes over a stone, the sharp projections of the stone force the armored tread of the tire into the hollow between the beads, if this is not closed up, and thus the tube is nipped or pinched. Also, when the usual metallic armor now employed is cracked, the loose ends themselves are very apt to perforate the tube.

My invention is designed to obviate the evils referred to.

The invention is best described by aid of the accompanying drawing, in which—

Figure 1:
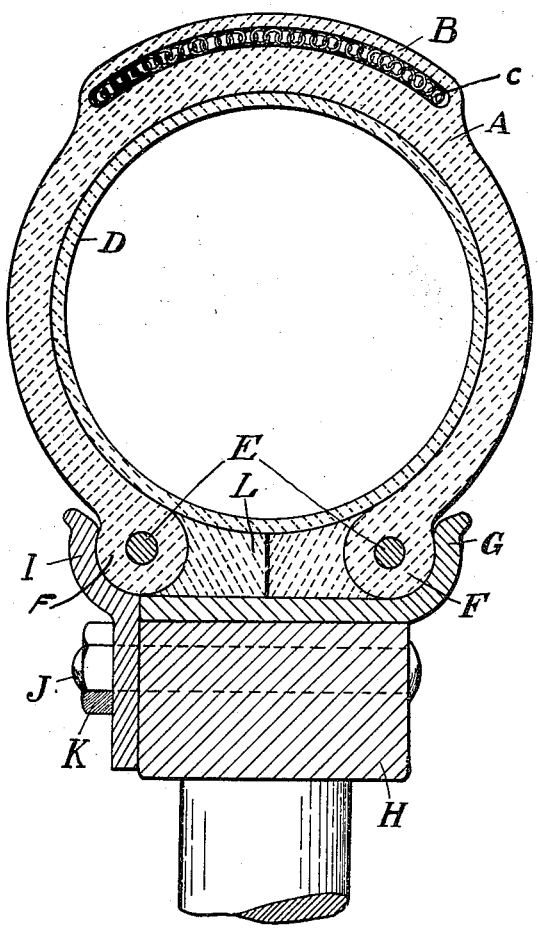
Figure 2:
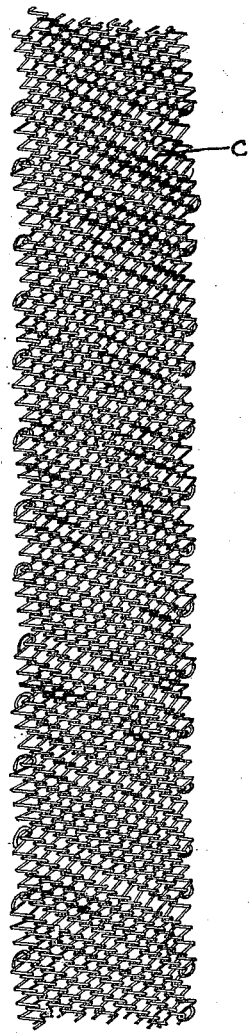

Fig. 1 is a cross-section of a part of the wheel with my improved tire mounted thereon, and Fig. 2, a plan view of a portion of the armor used in the tire tread.

Referring first to Figure 1, A is the cover or tire body having a spiral spring armor plate or strip C in the tread B. D is the inner tube. E are the usual wires in the beads F. G is a partial rim of steel fastened by screws not shown to the felloe H. I is the other half of the rim and is firmly attached to the felloe by the screws J and nuts K. L is a packing or filler which will probably be made usually of india-rubber but can be of any tolerably hard and resilient material.

Now looking at Figure 2, this shows an armor plate C of spiral steel springs interwoven into each other. It is cut out of the sheet slightly diagonally so that the individual spiral springs forming the armor strip are arranged with their longitudinal axes slightly on the bias; consequently the armor plate all around the rim can be joined up as an endless piece by a spiral spring, similar to the spiral springs which go to make up the armor strip, inter-meshing with the two adjacent spiral springs at the ends of the plate and extending for perhaps one-quarter of the diameter of the wheel and gradually passing therefore from one side to the other. About every two or three inches a spiral spring will be cut, and at this point the end of the wire is either hammered in or bent round the next in such a manner as to have no chance of standing out to prick the rubber. Now when an ordinary tire without a block L has a puncture, the two beads which are usually tolerably sharp-edged press tight on each side against the tube, and not infrequently fracture it. Now in my case as will be seen from the drawing, if the entire tire was pressed flat, the two beads would still be the same distance as before apart, and will not come against the sides of the inner tube, as they will come against the block L, and thus the inner tube will be supported in a comparatively straight line next to the block L, the outer surface and edges of which are slightly concave transversely thereof so as to cooperate with the beads F to provide a practically flat supporting surface in case the inner tube becomes deflated. The part G and the part I are just sufficiently curved inwards to hold perfectly safely on to the cylindrical beads F and the parts G and I are so proportioned that they will grip the two beads with sufficient pressure. Practically this will be avoided if necessary by regulating the width of the felloe H or the width of the part G.

Referring further to Fig. 2 of the drawing, it will be seen that the edges of the armor strip, by reason of the slightly angular arrangement of the individual spiral springs, are formed at intervals by the free ends or extremities of the springs, and between these extremities by certain of the end convolutions of the springs. As heretofore stated, the free ends of the springs are bent down so as to prevent their piercing the tire body.

In Fig. 1 of the drawing, it is to be noted that the upper edges of the rim members G and I are curved outwardly away from the body of the tire. The upper surface of these curved portions, the upper surface of the block L, and the tops of the beads F all lie in substantially the same plane so as to prevent damage to the tire and tube in case of deflation, and also to provide a substantially flat support when a puncture occurs.

I declare that what I claim is:—

1. An armor for tires comprising a fabric composed of a series of intercalated spiral springs having their longitudinal axes arranged on the bias.

2. An annular armor strip for tires comprising a fabric composed of a series of spiral springs intercalated with each other and extending at a slight angle from one edge of the strip to the other.

3. An annular armor strip for tires comprising a fabric composed of a series of spiral springs intercalated with each other and extending at a slight angle from one edge of the strip to the other, the edges of said strip being formed by the end convolutions of said springs and at intervals by the spring extremities.

4. In an armored tire, the combination of a tire body having spaced beads on the inner periphery thereof; an annular filler interposed between said beads and filling the space there between, the upper surfaces of said filler and said beads being adapted to form a substantially flat surface upon the deflation of the tire under load; an inner tube within said tire body; and an annular armor strip embedded in the tread of said tire body, said strip comprising a fabric composed of a series of intercalated spiral springs having their axes arranged at a slight angle with reference to the circumference of the tire body.

5. In an armored tire, the combination of a tire body having spaced beads on the inner periphery thereof; an annular filler interposed between said beads and filling the space there between, the upper surfaces of said filler and said beads being adapted to form a substantially flat surface upon the deflation of the tire under load; an inner tube within said tire body; and an endless armor strip embedded in the tread of said tire body and formed of wire fabric, comprising spiral springs intercalated with each other and extending at a slight angle from one side of the armor strip to the other.

In witness whereof, I have hereunto signed my name this 30th day of March, 1921, in the presence of two subscribing witnesses.

PETER JONES.

Witnesses:
JOHN MCLACHLAN,
H. STERK.